United States Patent
McCormack (10) Patent No.: US 9,124,442 B2
(45) Date of Patent: Sep. 1, 2015

(54) HOME AUTOMATION SYSTEM AND METHOD FOR CONTROLLING THE SAME

(75) Inventor: James Joseph Anthony McCormack, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 721 days.

(21) Appl. No.: 13/380,911

(22) PCT Filed: Jun. 18, 2010

(86) PCT No.: PCT/IB2010/052753
§ 371 (c)(1), (2), (4) Date: Mar. 16, 2012

(87) PCT Pub. No.: WO2010/150155
PCT Pub. Date: Dec. 29, 2010

(65) Prior Publication Data
US 2012/0165990 A1    Jun. 28, 2012

(30) Foreign Application Priority Data

Jun. 25, 2009 (EP) ..................... 09163714

(51) Int. Cl.
G06F 19/00 (2011.01)
H04L 12/28 (2006.01)
H05B 37/02 (2006.01)

(52) U.S. Cl.
CPC .......... *H04L 12/282* (2013.01); *H05B 37/0272* (2013.01); *H04L 2012/285* (2013.01); *H04L 2012/2841* (2013.01)

(58) Field of Classification Search
USPC ............................ 700/275; 370/329; 718/100
See application file for complete search history.

(56) References Cited

U.S. PATENT DOCUMENTS

| | | | | |
|---|---|---|---|---|
| 5,010,459 | A * | 4/1991 | Taylor et al. | 362/85 |
| 2001/0010032 | A1 * | 7/2001 | Ehlers et al. | 702/62 |
| 2001/0056544 | A1 * | 12/2001 | Walker | 713/200 |
| 2003/0093252 | A1 * | 5/2003 | Frankel et al. | 703/13 |
| 2005/0024254 | A1 * | 2/2005 | Chuey | 341/176 |
| 2007/0248047 | A1 * | 10/2007 | Shorty et al. | 370/329 |
| 2008/0091309 | A1 * | 4/2008 | Walker | 701/1 |
| 2008/0130562 | A1 * | 6/2008 | Shorty et al. | 370/329 |

(Continued)

FOREIGN PATENT DOCUMENTS

| | | |
|---|---|---|
| CN | 1661976 A | 8/2005 |
| EP | 1443709 A2 | 8/2004 |

(Continued)

*Primary Examiner* — Michael D Masinick
*Assistant Examiner* — Anthony Whittington
(74) *Attorney, Agent, or Firm* — Meenakshy Chakravorty (57) ABSTRACT

The invention relates to a home automation system and a method for controlling the same. In order to stably control a continuing concerted adjustment action of a continuously variable parameter by means of few and low-sized commands in order to avoid overloading of a low-data rate network while providing means for fast and unobtrusive correction of failures due to missed commands, it is provided a method for controlling a wireless home automation system, the home automation system being arranged as a network comprising at least one controller and a plurality of devices, wherein the method comprises the steps of sending a start command from the controller to a group of devices comprising an action type and a transaction ID and sending a stop command from the controller to the devices comprising the transaction ID and a controller counter.

14 Claims, 5 Drawing Sheets

(56) References Cited

U.S. PATENT DOCUMENTS

2009/0082888 A1* 3/2009 Johansen ................ 700/94
2009/0300616 A1* 12/2009 Sicurello et al. ............ 718/100
2010/0087958 A1* 4/2010 Mullet et al. ................ 700/279
2011/0310621 A1* 12/2011 Van Der Stok et al. .. 362/311.12

FOREIGN PATENT DOCUMENTS

| EP | 1833225 A1 | 9/2007 |
| JP | 2008108634 A | 5/2008 |
| WO | 2008097434 A2 | 8/2008 |

* cited by examiner

HOME AUTOMATION SYSTEM AND METHOD FOR CONTROLLING THE SAME

TECHNICAL FIELD

The invention relates to a home system and to a method for controlling the same.

BACKGROUND OF THE INVENTION

Wireless home automation systems for use in homes as well as in offices, shops, theaters or hospitals will be omnipresent in future for controlling a simultaneous and concerted performance of many devices. Such systems may for instance comprise lighting systems for controlling light sources and shadowing elements or sound systems for controlling loud speakers or other stereo-equipment.

A robust and reliable method for controlling such a system is based on unicast commands sent from a central controller to each individual device followed by an acknowledgment of the command sent from the respective device to the controller. This method may be suitable for controlling individual or few devices, e.g. for controlling the dimming of single lamps. Yet, for controlling the coordinated action of a device group, e.g. for applying a scene setup, unicast commands would fail to result in a simultaneous reaction of the respective target devices and would cause a visible delay and asynchronous responses (pop-corn effect).

Moreover, in low data rate networks, such as Zigbee or zwave, only a limited command rate is available. Certain commands may particularly load the network (for example those requiring high repetition rates or ones with high fan-out and/or fan-in) and cause network flooding, thereby provoking serious problems in controlling the system or inducing artifacts visible to a user. In particular, commands for dimming in a lighting system may easily overload the network.

As an alternative—less robust, but also less demanding with respect to the network capacity, the commands may be broadcast to the target devices. Yet, this holds the risk of a target device missing a command and thereby getting out of synchronisation with the other devices.

U.S. Pat. No. 5,010,459 A1 relates to a stage lighting system with a plurality of automated lamp units, wherein cue data for controlling the lighting effect are simultaneously broadcast to all lamp units during system initialization and stored in the individual lamp unit memories. Each lamp unit reacts individually to an updating command based on the stored data. However, if one lamp has missed an update, this will lead to visible disturbing artifacts in the scene illumination.

Particularly sensitive are commands for controlling a continuing synchronized action, which is performed by a multitude of devices for adjusting a continuously variable parameter of the devices, wherein the user stops the action, when a desired level is reached. For instance, a dimming action of a set of lamps can be controlled to adjust the illumination of a room and in particular when the initial and/or target end dimming levels are unequal (e.g. so-called scene dimming). When the desired level of brightness is reached, the user can stop the enduring dimming action. If a lamp in a lighting system has missed the broadcast stop command, it continues dimming beyond the desired level, although the other lamps have already stopped dimming.

Therefore, the question arises how to make broadcast or groupcast commands more robust and how to provide unobtrusive correctives to devices that have missed a command, without causing network flooding (e.g. by excessive network messaging caused by using high broadcast rates) or visible artifacts.

SUMMARY OF THE INVENTION

It is therefore an object of the present invention to provide a home automation system and a method for controlling the same in order to stably control a continuing concerted action of devices by means of few and low-sized commands in order to avoid overloading of a low-data rate network while providing means for fast and unobtrusive correction of failures caused by missed commands.

The object is solved by the features of the independent claims.

The main thought of the invention is to provide a method for controlling a wireless home automation system, the home automation system comprising at least one controller and at least one device, wherein the method comprises the steps of sending a start command from the controller to the device and sending a stop command with a controller counter from the controller to the device. The controller counter represents a value summarizing the amount of the commanded continuously performed action at the end of the non-punctual command, which lasts over a certain period. The controller counter value may exclusively represent the stop command in a very simple realization. Alternatively or additionally, it may be included in the stop command. Thus, by including a controller counter in the stop command, every device that fails to perform the total number of action steps and thus to reach the commanded outcome can correct its level according to the controller counter. This is of particular use for a system comprising two or more devices communicating at least partially via a wireless network.

In a preferred embodiment, the start command comprises a transaction ID, an action type and/or an action rate. Alternatively, the action rate may be replaced by a step number with a transition time. Thus, the user can select the speed of the action. The transaction ID has the function to unambiguously assign commands to an ongoing action, in particular, when more than one action is simultaneously performed by devices of the system. This avoids interference or confusion between commands associated to different ongoing actions. Specifying an action type may be required, if a target device can perform different actions. By having the option to include these parameters in the commands, the method becomes highly flexible and especially suitable for large systems with many devices and many different executable actions.

In another preferred embodiment, intermediate commands comprising the controller counter are sent to the devices. These intermediate commands serve as updating commands, so that if a device has missed a preceding command, it can catch up by correcting its level according to the received controller counter. Thus, every device can compare its current device counter with the updated controller counter and may check whether these values are in agreement. This increases the stability of the ongoing command and the synchrony in case of many devices. Moreover, due to this intermittent correction possibility, a missed command is less noticeable and a serious failure in the final result is less likely.

Preferably, the intermediate commands comprise furthermore the transaction ID, the action type and/or the action rate or the step number with the transition time. Hence, also a missed start command does not lead to a lack of information, since all important parameters are repeated in the intermediate command, and the respective device may keep track of the action to be performed.

Preferably, the method comprises additionally the steps of sending a stop acknowledgement from the device to the controller comprising a device counter, checking by the controller, whether a stop acknowledgement from all devices has been received and/or whether all received device counters correspond to the controller counter and sending from the controller a stop correction command comprising the stop command, if the stop acknowledgement from a device is missing and/or if a device counter is different from the controller counter. This feedback increases the reliability of the system by ensuring that all devices are in a communicating state and that they have received and correctly executed the command, and by providing fast and unobtrusive correction means, if that should not be the case.

In a preferred embodiment, the stop correction command is unicast to all erroneous devices. Every device which has shown a faulty performance receives an individual correction command one by one. Hence, the system may selectively correct the failure of each erroneous device.

Preferably, the erroneous device sends a stop correction acknowledgement to the controller, so that the principle operability of the device is ensured. If the erroneous device does not react to a correction command, it may be marked and reported as non-functional in the system.

If the acknowledgements to the stop command or to correction commands are sent from the devices with a device-specific delay time, the network load is distributed over a time period and a network load peaks can be avoided.

In a preferred embodiment, the start and stop commands are broadcast to the devices. Thereby, a high synchronity and a low latency can be guaranteed.

Preferably, an embodiment of a method according to the present invention comprises further the steps of correcting a device counter of each device and a corresponding device status, if the device counter is not in agreement with the controller counter. Thus, upon receiving a controller counter included in a command from the controller, a device compares the controller counter with its current device counter and corrects its status in case of disagreement.

Preferably, the controller counter and the transaction ID are composed in one number.

Preferably, one of the method embodiments may be used in a lighting system, wherein the action performed by the devices comprises a dimming action.

In a preferred embodiment, a home automation system according to the present invention comprises at least one device and a controller adapted for wireless communication with the devices, wherein the controller is further adapted to send a start command and to send a stop command comprising a controller counter. In the commands, it may further be included an action type and/or a transaction ID.

Preferably, the controller is furthermore adapted to check acknowledgments of the stop command received from the devices and to send a stop correction command to erroneous devices.

In a preferred embodiment, a home automation system comprises a lighting control system with light sources and/or light shields and the action comprises modification of light properties. For instance, the modification of light properties may refer to changing a color temperature or a color of light, a scene illumination in a room or ambience, a width, focus, direction or tilt of a light beam or an intensity or brightness of a light source (dimming).

In another embodiment, the home automation system comprises a sound control system with loud speakers and/or the action comprises a sound regulation action. Here, the properties of sound are modified, e.g. for harmonising multiple speakers, for adjusting the timbre or the volume. Obviously, the home automation may comprise a combination of both systems and additionally also other types of systems, e.g. heating or locking systems.

The embodiments of home automation systems according to the present invention may be adapted to employ any of the method embodiments described above. The advantages of these embodiments correspond therefore to those of the corresponding method embodiments described above.

Preferably, a controller for controlling a home automation system according to the invention is adapted for sending a start command to a group of devices and for sending a stop command to the devices comprising a controller counter. The controller according to the invention is adapted to perform any of the method embodiments from above with the described advantages.

Thus, the present invention provides means for synchronizing and concerting the execution of tasks performed by multiple devices of a network. However, in the invention, the controller does not simply impose the same value or level to all devices, but rather aligns the behaviour of many devices. The controller counter, which is set equal to all device counters, relates to the period during which the action is to be performed, but the level or status of the individual devices is free to differ among each other. Therefore, also actions can be controlled and synchronised, wherein the devices start from a different level or perform the action with a different rate. By these means, the invention achieves high reliability with maximum control while reducing the amount of network load to a minimum and high synchrony while allowing for high flexibility due to independent activity of the individual devices. By broadcasting the start, stop and intermediate commands, network flooding with too many broadcasts can be avoided and the command can act at multiple points simultaneously. Due to this parallelism in data link transmission, broadcasting results in saving time and avoiding high latencies. Embedding a transaction ID and a controller counter in the commands allows any target device to follow the transaction and to react locally if it has missed a command in the sequence.

BRIEF DESCRIPTION OF THE DRAWINGS

In the following, the invention will be described with respect to preferred embodiments, wherein.

DETAILED DESCRIPTION OF EMBODIMENTS

The home automation system according to the present invention comprises a controller and at least one device, which are communicating via a wireless network or via a combined network comprising wireless and wired parts. The system may also comprise more than one device, e.g. a TV set, and preferably two or more devices, e.g. loudspeakers, light sources or shading elements, which can be controlled by the controller. Commonly, low data rate networks are employed in such systems, using e.g. Zigbee, NFC or zwave.

In particular, the invention relates to a continuously controlled action for adjusting the performance of a device, wherein a user reacts to the progressing action and stops it when a desired effect is achieved. Thus, the action performed by the devices is preferably no qualitative or binary action, but rather a quantitative and continuously changing action.

In one embodiment, the home automation system may comprise a lighting control system with multiple lights, lamps, venetian blinds, jalousies and/or shadowing elements. Such a system can also compromise other sensory elements as part of a scene (e.g. fragance generator, AV streamers/displays, etc.). These devices can be controlled by the controller via wireless communication means for modifying the properties of the respective device, e.g. the volume, the timbre, the fragrance, the light intensity, the color of light, the color temperature, the width, tilt, direction or focus of the light beam or the level of the sunblind. For instance, in a living room, a user may select different scenes of illumination adapted for watching television, illuminating paintings, shading-off the sun, or the like.

Another embodiment for a home automation system according to the present invention may comprise a sound control system with multiple speakers or hifi systems, wherein the controller controls the devices for adjusting the sound, e.g. balance between the speakers, volume, timbre, etc. However, the home automation system may also be a combined system comprising both, a lighting and a sound control system, and optionally other components, as controlling means for the heating or the garage door.

Figure 1:
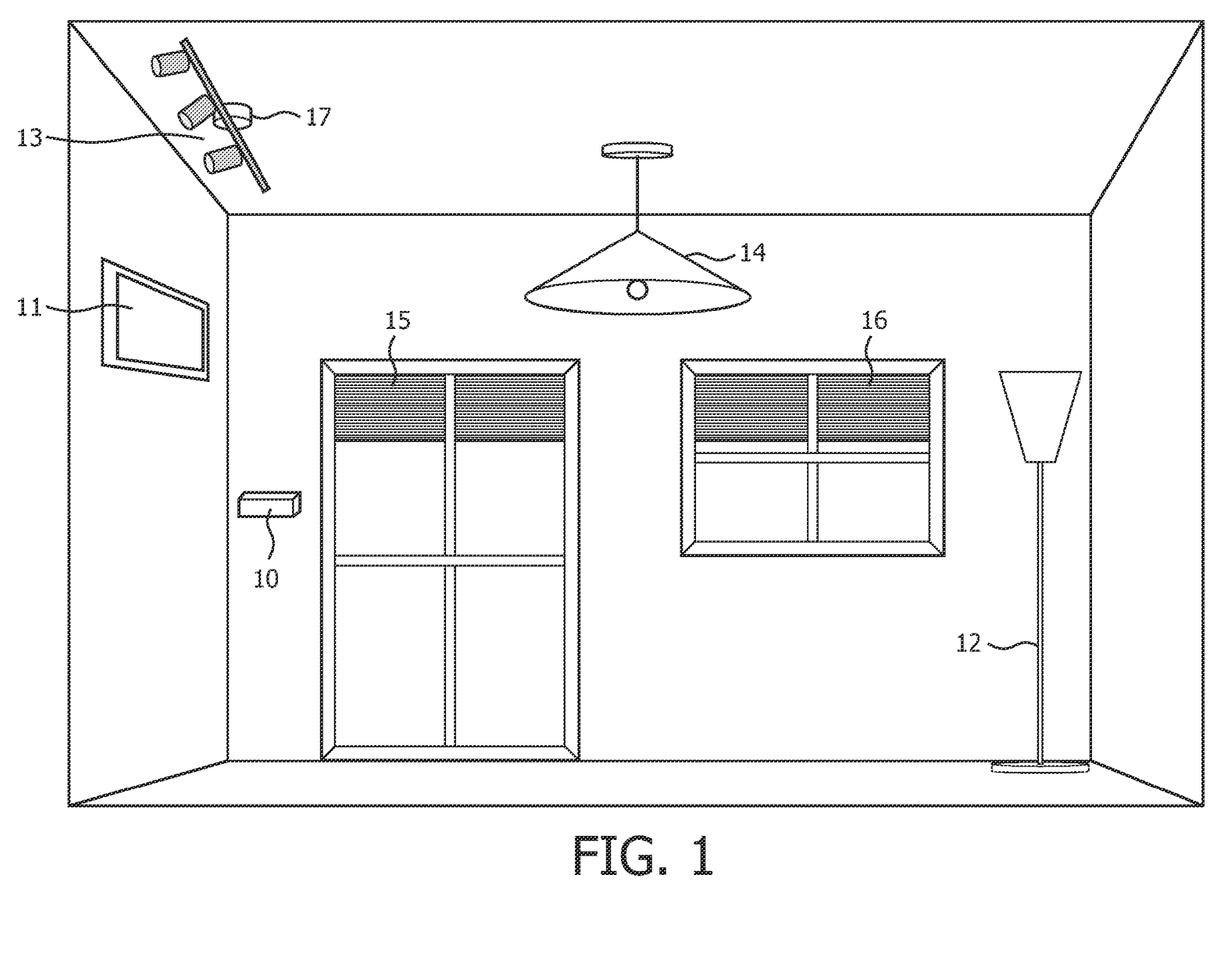
FIG. 1 shows an exemplary home automation system according to the invention.

Without limiting the home automation system according to the present invention, the system is examplified by a lighting control system as shown in FIG. 1. Thus, the same method can be applied to a sound control system or a combined home automation system.

In FIG. 1, a lighting control system is shown with a controller 10, halogen lamps 13 with external driving means 17 for illuminating a painting 11, lamps 12 and 14 and jalousies 15 and 16. The controller 10 is adapted to wirelessly communicate with the various target devices 12-16. It should be noted that the controller 10 may have multiple interfaces based on different communication technologies and that the wireless communication may proceed via radio frequency or microwave communication, IR transmission, bluetooth or the like. For this, the controller 10 is provided with a receiver/transceiver and a user interface. The user interface may comprise user input means, e.g. touch screens, turning knobs, joy sticks, switches or buttons either on a remote control, on the surface of the controller 10 or simply on the wall. Moreover, a display may be provided on the controller and/or on a remote control. The controller 10 further comprises a control circuit that may include a microprocessor, a microcontroller or a programmable device. The control circuit may generate a required count signal for generating the controller counter value. Preferably, the controller 10 also includes a memory for storing a list of target devices for broadcast or groupcast, predetermined setups for sceneries with predetermined parameters (rate, group of target devices), device addresses or group addresses. These settings may either be preset, setup at commissioning or by the user.

Each of the devices 12-17 in the lighting control system shown in FIG. 1 has driving means for adjusting parameters of the device. The driving means may be integrated in the device, as shown for the lamps 12 and 15 or for the jalousies 16 and 17, or external driving means 14 may be provided, as shown for the halogen lamps 13. The driving means of the lamps may comprise means for modifying illumination properties, for example changing the color or the color temperature of the emitted light or the width, tilt, intensity or direction of the light cone. Moreover, driving means may also be operatively coupled to more than one light source. Each of the devices 12-16 may further comprise control means and a memory for storing the device ID and preset parameters for an action to be performed. The control means are adapted to control the execution of commands received from the controller 10 and to send acknowledgement messages back to the controller.

The plurality of devices may be arranged in preselected groups or sets. The groups may either be determined based on the distance to the controller 10, e.g. all light sources in a room, or based on the distance to the user who inputs the command. In the latter case, devices whose performance can be observed by the user are better controlled. The groups may also be predefined according to a scene action to be performed.

Using the example of the lighting control system of FIG. 1, a user may decide for illuminating a painting 11 by means of the halogen lamps 13. For this, he may select on a remote control the option 'painting', wherein only the halogen lamps 13 are addressed. The user may adjust the brightness and the tilt of the light cones by keeping the button pressed until reaching the desired level or by pressing the button again, when the desired effect is reached. Another scene option may adjust a comfortable illumination for dining, wherein the painting 11 is illuminated by the halogene lamps 13 and the ceiling of the room by the standard lamp 12 in a user-defined manner. In another option 'shutter', the user may choose to lower the jalousies 15 and 16 in the room or all jalousies on the southern side of the house.

The devices may all respond individually and independently from each other to the received commands, corresponding to their preset parameters for the commanded action or according to their current state.

Figure 2:
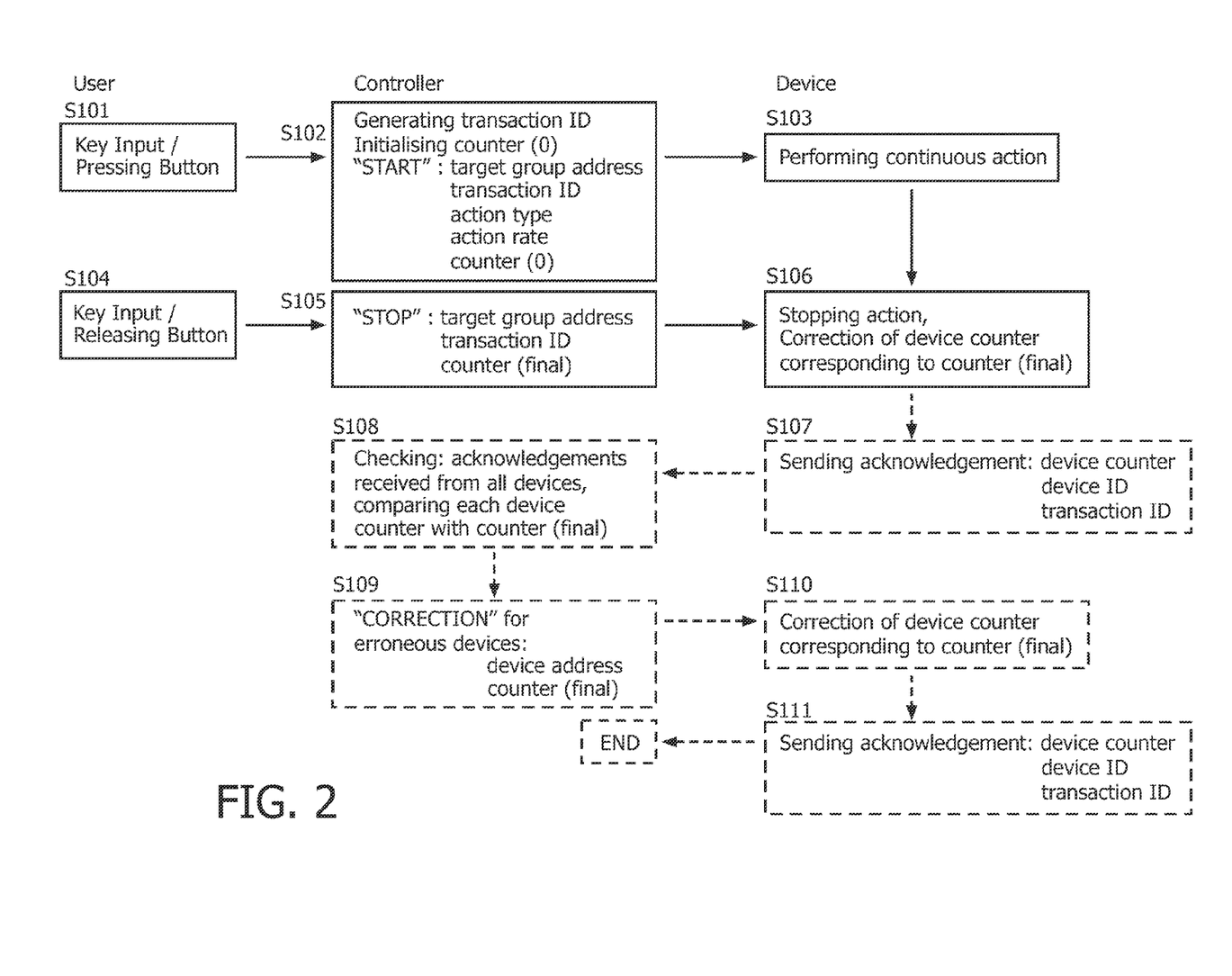
FIG. 2 shows a flow chart illustrating an embodiment of a method according to the invention.

Referring to FIG. 2, a method according to the invention for controlling such a home automation system comprises following steps: When the user presses a control button for starting an action (S101), the controller 10 reads or creates a transaction ID and initialises a controller counter cc=0 (S102). Then, the controller 10 sends a start command to at least one target device 12-16 (S102). The start command does not have to comprise any information, if only one action can be performed by the target devices and if the parameters for performing the action are stored in the devices. However, in a more complicated system, the start command comprises preferably an action type and a transaction ID. The transaction ID, which may be a random number, identifies the action command, so that, if several commands for different actions are sent simultaneously or successively, each command can be unambiguously associated to an ongoing action. The transaction number may only be included in the messages, if several actions are performed simultaneously. Preferably, the start command is broadcast to the devices. A list of the device addresses or of the device ID's of the target group may be stored for every action or scene in the memory of the controller 10 or of the single devices or may be selected by the user. Preferably, the start command comprises further the group of target devices, so that each device can determine itself whether it is object of the commanded action, and may include an action rate defining the velocity, with which the action is to be performed by the devices. The initial controller counter cc (=0) may also be included in the start command. Thus, the information that an action should be started may either be communicated to the target devices by the fact that the start command is the first command with this transaction ID or by including the initial controller counter cc. The controller counter and the transaction ID may be composed in one composed number. After receiving the start command, the target device starts to perform the commanded action (S103).

For stopping the continuing action, the user either releases the control button or, alternatively, presses the button again (S104). The controller transmits to the group of target devices a stop command that comprises the final controller counter and preferably the transaction number (S105). The final controller counter determined by the controller defines a number of action steps that should have been performed by each device at the time when the user decides to stop the action. By including the final controller counter cc in the stop command, a final device counter dc corresponding to the number of action steps actually performed by the respective device at the time of receiving the stop command can be compared to the final controller counter cc. If these counters are not in agreement, the device status and the corresponding device counter dc are corrected by cancelling supernumerous steps or by performing additional steps until the number of steps of the device and the controller are in agreement, and the action performed by the device is stopped (S106).

In the method according to FIG. 2, further steps (dotted boxes in FIG. 2) may be included for additional correction and for ensuring that all devices have received the commands sent by the controller. For this, upon receiving the stop command and after an individually predetermined delay_before_response time, each device sends an acknowledgement back to the controller, comprising the device counter dc (possibly corrected), the device address or the device ID and the transaction ID (S107). While the commands from the controller are preferably sent simultaneously to all target devices, the acknowledgements are preferably unicast and spread in time (individual delay_before_response times of each device) for avoiding network overload by keeping the simultaneously transmitted amount of data small. After a predetermined delay_before_checking time given by the maximum delay_before_response time of the target devices, the controller checks whether all devices of the broadcast list have responded and compares the returned device counter dc of each device with the final controller counter cc (S108). If one of the devices has returned a device counter dc that does not agree with the final controller counter cc or if one device has not acknowledged at all, the controller unicasts a stop correction command to the erroneous device, comprising at least the final controller counter cc (S109). Preferably, a tolerance interval for a minor deviation between the controller counter cc and the device counter dc is predetermined and a correction command may be sent only in case of drastic discrepance. The device corrects its level corresponding to the final controller counter cc (S110) and, preferably, sends a correction acknowledgement back to the controller (S111), comprising the corrected device counter dc, the device ID and optionally the transaction ID.

Figure 3:
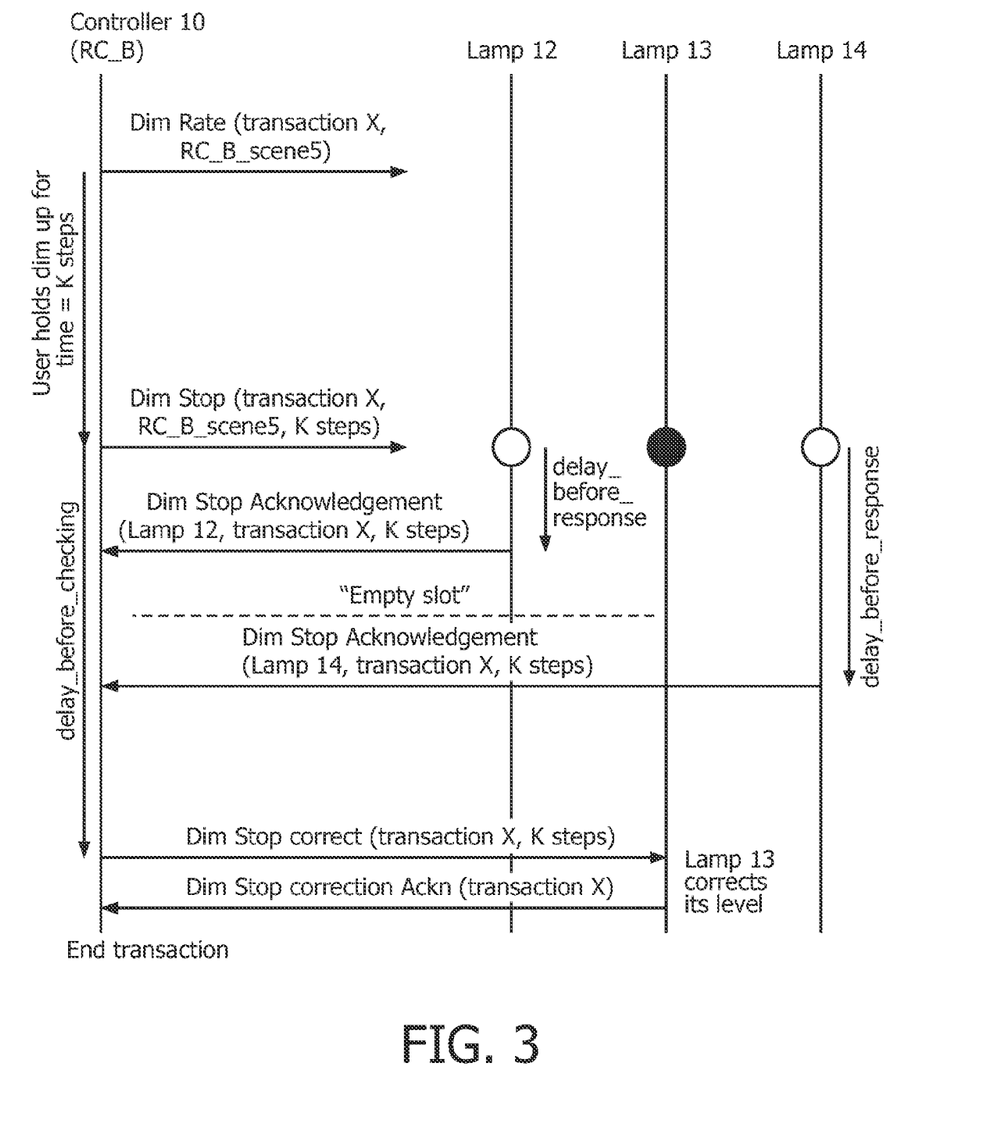
FIG. 3 shows a process employing a method according to the invention.

Referring to the exemplary embodiment of FIG. 1 and to the method of FIG. 3, if the user presses the button in order to start dimming, the controller 10 broadcasts or scene-groupcasts a start command 'Dim Rate' to all devices of a group, comprising the action type (dimming), the action rate how fast the dimming has to be performed, the group address RC_B_scene5 and the transaction ID X. After the lamps 12, 13 and 15 have received the 'Dim Rate' command, they start dimming with the given rate. The bright circles indicate successfully received broadcasts, the dark circles indicate missed broadcasts. The user presses the button again for stopping the dimming action, when the desired level of brightness is reached. Then, the controller transmits a stop command 'Dim Stop' comprising the group address (RC_B_scene5), the transaction ID X and the final controller counter cc with the nominal number of performed dim steps K (cc=K). After a lamp specific delay_before_response time, each of the lamps 12, 13 and 15 unicasts a 'Dim Stop Acknowledgement' to the controller 10 with the corresponding device ID of the lamp, the transaction ID X and the device counters with the number of dim steps performed by the respective lamp. Lamp 13 has missed the 'Dim Stop' command and therefore does not send a 'Dim Stop Acknowledgement'. After a predetermined delay_before_checking time, the controller 10 checks whether all lamps have acknowledged and/or whether the device counters of all lamps agree with the controller counter. Since the acknowledgement of lamp 13 is missing, the controller unicasts a 'Dim Stop Correction' command comprising the transaction ID X and the final controller counter cc=K to the erroneous lamp 13. The lamp 13 corrects its level of dimming according to the final controller counter and returns a 'Dim Stop Correction Acknowledgement' with the transaction ID X.

The parameters of action for certain scenes may be stored in the individual devices and differ among them. For instance, a device specific action rate or step size may be stored in each device, so that lamp 12 may dim simultaneously with the halogene lamps 13, but with a slower rate or smaller increments (steps). Thus, although the same controller counter cc is imposed to all devices and the device counters dc are set to this value, the individual level of each device may be different. Thus, the dimming action may be started from different starting levels of brightness or with different rates or with different step sizes of dimming in order to establish a brightness gradient in the room.

The advantage of this method is that the number of network commands is very low making it suitable for low broadcast rates while providing a reliable recovery mechanism to missed broadcast commands. However, if the dimming action is long, the missed command and the recovery may be visible, possibly causing the user to try again. Therefore, the recovery stage after user button release has to be quick, preferably less than 200 ms to prevent interference with the next attempt of the user.

Figure 4:
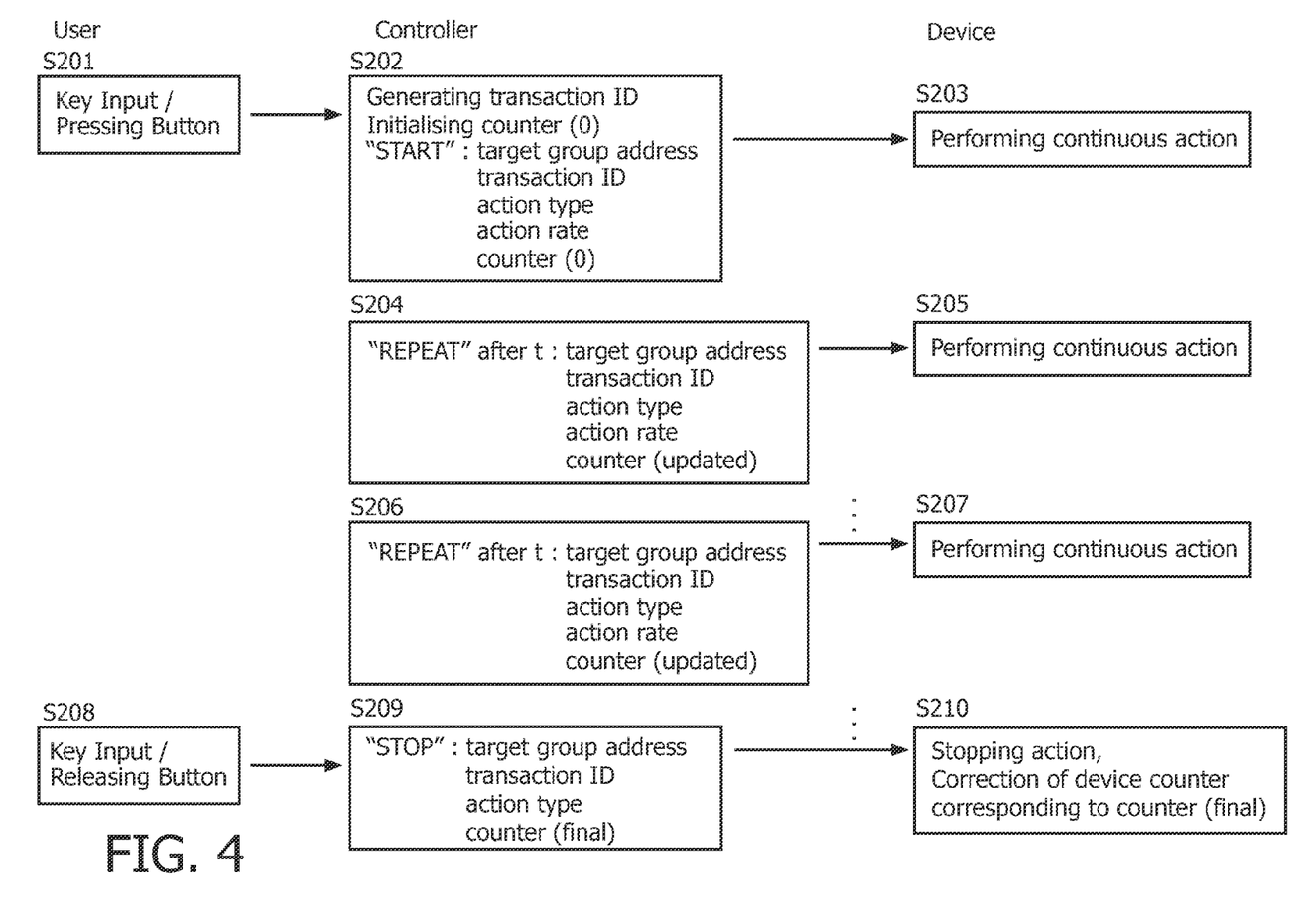
FIG. 4 shows a flow chart illustrating an embodiment of a method according to the invention and FIG. 5 shows a process employing a method according to the invention.

These issues can be avoided by including intermediate repeat commands broadcast by the controller at predetermined time intervals in case of long action times. This leads to command redundancy and thus to increased control robustness. Referring to FIG. 4, the controller 10 transmits the intermediate repeat commands to the group of target devices in regular time intervals t comprising the transaction ID and the updated controller counter cc and optionally the action type and the action rate (S204, S206). The controller counter cc determined by the controller is a function of time since the controller counter cc is updated for every new command. The intermediate repeat command may either be merely repeated with an updated controller counter or it may comprise new information about how the action is to be performed, e.g. if the user chooses to change the action rate or other command parameters. By sending intermediate commands, at least one of these will be received by the devices of the target group. If the device counter dc and the sent controller counter differ from each other, the respective device corrects its level according to the intermediate controller counter cc. Thus, the system becomes more tolerate of missed commands and the correction of the status of an erroneous device is more subtle.

Figure 5:
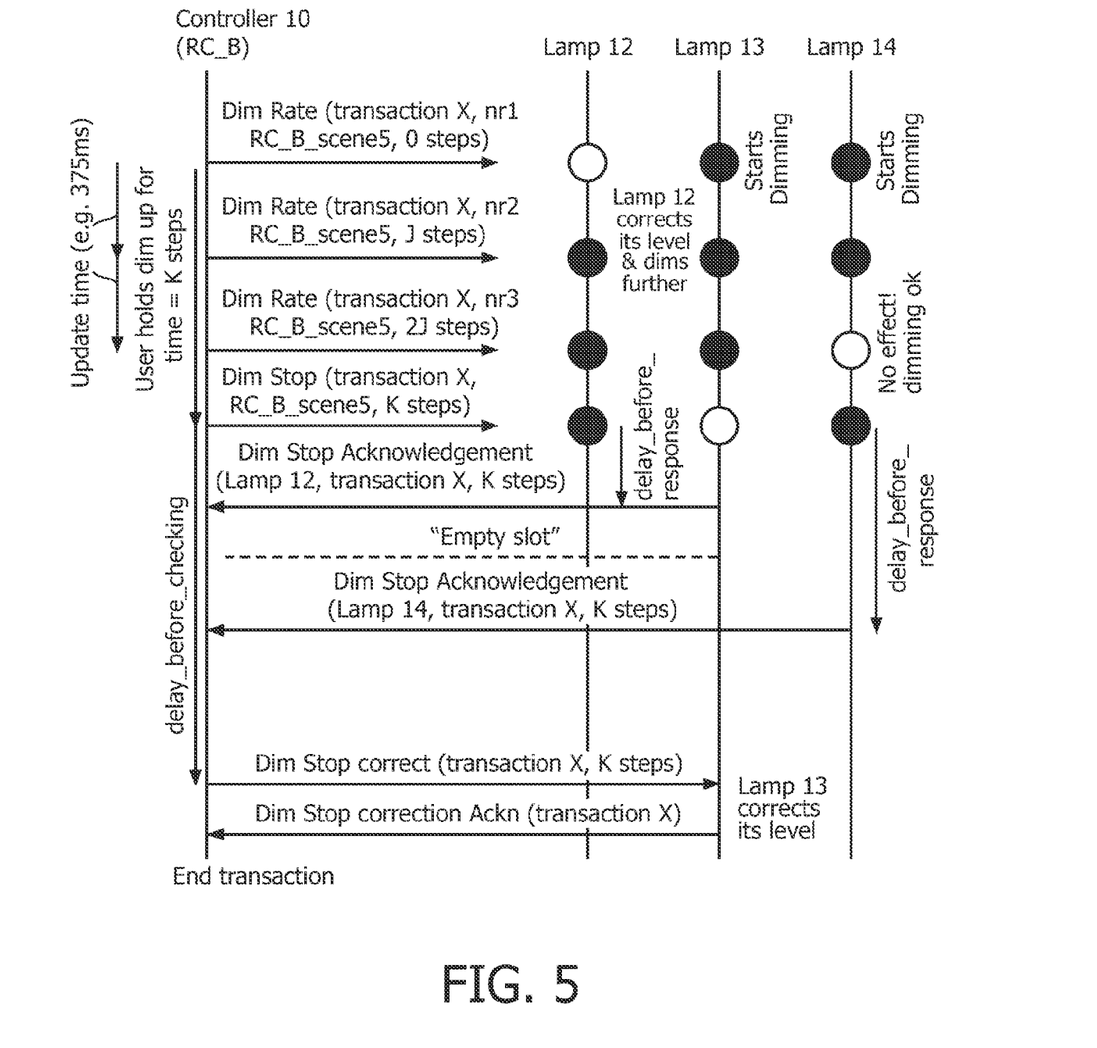

The devices preferably perform the action continuously with a certain action rate specified in the start command and/or in the intermediate commands. With reference to FIG. 5, the controller 10 sends a start command 'Dim Rate' to the lamps 12, 13 and 15 comprising the transaction ID X, the number of sent commands (nr1), the group (RC_B_scene5) and the controller counter cc (0 steps). The bright circles indicate again successfully received broadcasts, the dark circles indicate missed broadcasts. Lamp 12 misses the start command nr1, but receives the repeated command nr2, comprising the transaction ID X, the number of sent commands (nr2), the group (RC_B_scene5) and the updated controller counter cc (J steps). Lamp 12 corrects its brightness level and joins the dimming action of the group. Lamp 15 misses the third command nr3. However, this has no effect on the performance of lamp 15, since it has already received the start command nr1 and the earlier intermediate command nr2. Thus, lamp 15 continues dimming with the given rate. Lamp 13 misses the stop command 'Dim Stop' with the final controller counter cc (K steps) and continues dimming, while all others having received the stop command have stopped dimming. Lamp 13 does not unicast a Dim Stop Acknowledgement after its specific delay_before_response time. After the controller 10 has checked the acknowledgements with the device counters received from the lamps, the controller perceives the erroneous lamp 13 and unicasts a Dim Stop Correction with the transaction ID X and the final controller counter cc (K steps) to lamp 13. Lamp 13 corrects its dimming level and sends a Dim Stop Correction Acknowledgement back.

With this method, a missed start command or one or more missed intermediate commands is not noticeable, since the device continues the started action with the given rate. However, if the stop command is missed, the action is continued and may lead to visible artifacts. Yet, with the above described acknowledgement-correction method and a fast correction, this will have no serious effect.

Instead of a continuously progressing action with a linear action rate, an incremental progress may be defined by replacing the action rate with a step number n and a transition time t in the commands. The transition time t corresponds to the time between two intermediate commands and defines the period of time in which the n action steps have to be performed. If the user holds the action up for a longer time than the transition time t, an intermediate command is sent to the devices, thus giving the command to continue the action for another transition period t. Thus, the action is performed discontinuously or incrementally by the devices. In this case, if one or more intermediate commands are missed, the recoveries are more visible than if using an action rate. Yet, a missed end command is not noticeable, since the devices only operate for the predetermined period of the transition time t and then stop. This is in particular advantageous for devices with long delay_before_response times.

By including a controller counter cc in the stop command, the command is summarized, when the command itself is finished after continuing for a user-defined period. When the controller counter cc is included in the intermediate commands, it serves for additional control, eventually updating and correcting an erroneous device counter dc (and thereby the device status) to the actual value of the controller counter cc. By these means, robust broadcasting in a low data rate network can be achieved, combining the advantages of lowest latency and synchrony of broadcasting with a high reliability and unobtrusive correction means of the controlling system.

In a one-to-one situation, wherein the system comprises a controller 10 and only one device, the main advantage of the method according to the present invention is the reduced number of broadcast and thus a low network traffic with a fast and unobtrusive auto-recovery and a reliable controller-device synchronisation, rather than a synchronous coordination across a plurality of devices, as in the case that the system comprises more than one device. For instance, when adjusting the parameters of a TV set (volume, brightness, color, . . . ) by using the method according to the invention, only two commands are required: a start command, e.g. for increasing the volume, sent when the user starts to press the corresponding button on a remote control, and a stop command sent when the user releases the button. After receiving the start command, the volume is increased with a constant rate. When the user is satisfied with the actual volume, he releases the button. Thereupon, the controller sends the stop command comprising the controller counter cc, which summarizes the amount of regulation steps. The TV set stops the volume regulation and compares its device value dc with the final controller counter cc correcting its level when indicated. Thus, for this minimal system, the methods as illustrated in FIG. 2 or in FIG. 4 can be employed, resulting in a efficient broadcasting system with a low number of commands and messages.

The invention claimed is:

1. A method for controlling a wireless home automation system comprising at least one controller and at least one device, the method comprising the steps of:
   receiving, at the controller, a start command;
   initiating, in response to the start command, a controller counter count at said controller;
   sending the start command from the controller to the device, the start command comprising the controller counter count; and
   receiving, at the controller, a stop command;
   sending the stop command from the controller to the device;
   sending a stop acknowledgement from each device to the controller, the stop acknowledgement comprising a device counter count; and
   checking, by the controller, whether a stop acknowledgement from all devices has been received and/or whether all received device counter counts correspond to the controller counter count.

2. Method according to claim 1, wherein the home automation system comprises two or more devices.

3. Method according to claim 1, wherein the start command further comprises an action type, a transaction ID, and/or an action rate or a step number n with a transition time t.

4. Method according to claim 1, further comprising the steps of:
   receiving, at the controller, one or more intermediate commands;
   incrementing, for each received intermediate command, the controller counter count; and
   sending said one or more intermediate commands to the device, each of the one or more intermediate commands comprising the controller counter count.

5. Method according to claim 4, wherein the one or more intermediate commands further comprise the transaction ID, the action type, and/or the action rate or the step number n with the transition time t.

6. Method according to claim 1, further comprising the steps of:
   sending from the controller, if the stop acknowledgement from a device is missing or if a device counter is different from the controller counter, a stop correction command comprising the stop command to the missing or erroneous device.

7. Method according to claim 6, wherein the erroneous device sends a stop correction command acknowledgement to the controller.

8. Method according to 1, wherein the stop acknowledgements from the devices are sent with a device-specific delay time.

9. Method according to claim 6, further comprising the steps of:
   correcting a device counter count of a device, and a corresponding device status, if the device counter count is not in agreement with the controller counter count.

10. Method according to claim 1, wherein the home automation system comprises a lighting system, and further wherein the start command comprises a light dimming action.

11. A home automation system, comprising:
   at least one device;
   at least one controller, the controller comprising a wireless transceiver configured or wireless communication with the devices, and further comprising a controller counter configured to initiate a controller counter count in response to a start command received from a user, wherein the controller is further configured to send to the at least one device the received start command and a stop command, wherein the start command and the stop command comprise the controller counter count, and wherein the controller is further configured to check a stop command acknowledgment received from the at least one device in response to the stop command.

12. Home automation system according to claim 11, wherein the controller is further configured to send a stop correction command to any of the at least one device where a device counter count differs from the sent controller counter count.

13. Home automation system according to claim 11, wherein the home automation system comprises a lighting control system with at least one light source and/or at least one light shield, and wherein the start command comprises modification of one or more light properties.

14. Home automation system according to claim 11, wherein the home automation system comprises a sound control system with at least one loud speaker and wherein the start command comprises a sound regulation action.

* * * * *